United States Patent [19]

Donath et al.

[11] 4,171,300

[45] Oct. 16, 1979

[54] PROCESS FOR THE MANUFACTURE OF METAL COMPLEX DYES

[75] Inventors: Peter Donath, Grenzach; Gerhard Back, Lörrach, both of Fed. Rep. of Germany

[73] Assignee: Ciba-Geigy AG, Basel, Switzerland

[21] Appl. No.: 892,557

[22] Filed: Apr. 3, 1978

Related U.S. Application Data

[63] Continuation of Ser. No. 770,251, Feb. 18, 1977, abandoned, which is a continuation of Ser. No. 604,417, Aug. 13, 1975, abandoned.

[51] Int. Cl.² .............. C09B 45/04; C09B 45/14; C09B 45/24; C09B 45/34
[52] U.S. Cl. .............. 260/145 B; 260/145 A; 260/146 R; 260/147; 260/148; 260/149; 260/150; 260/151; 260/429 C; 260/438.1; 260/438.5 R; 260/439 CY
[58] Field of Search ............. 260/145 A, 145 B, 147, 260/146 D, 148, 146 T, 149, 146 R, 150, 151, 156, 429 C, 438.1, 438.5, 439 CY

[56] References Cited

U.S. PATENT DOCUMENTS

| | | | |
|---|---|---|---|
| 2,778,816 | 1/1957 | Buehler et al. | 260/151 |
| 2,789,975 | 4/1957 | Ruckstuhl | 260/147 |
| 2,817,657 | 12/1957 | Buehler et al. | 260/151 |
| 2,819,259 | 1/1958 | Schmid et al. | 260/147 |
| 2,839,520 | 6/1958 | Neier | 260/145 A |
| 2,938,896 | 5/1960 | Strobel et al. | 260/151 |
| 3,185,676 | 5/1965 | Klein | 260/146 R X |
| 3,221,004 | 11/1965 | Neier | 260/151 |

FOREIGN PATENT DOCUMENTS 2256908  5/1974  Fed. Rep. of Germany ........... 260/413

OTHER PUBLICATIONS

Tenside, Detergents, vol. 11, pp. 57 to 71 (1974).

*Primary Examiner*—Floyd D. Higel
*Attorney, Agent, or Firm*—Edward McC. Roberts

[57] ABSTRACT

A process for the manufacture of metal complex dyes, wherein a metallisable dye is reacted with a metal compound in a solvent and in the presence of a hydroxycarboxylate.

14 Claims, No Drawings

PROCESS FOR THE MANUFACTURE OF METAL COMPLEX DYES

This is a continuation of application Ser. No. 770,251 filed on Feb. 18, 1977, now abandoned, which is a continuation of application Ser. No. 604,417, filed Aug. 13, 1975, now abandoned.

The present invention provides a process for the manufacture of metal complex dyes, wherein a metal compound is reacted in the presence of polyhydroxycarboxylates with a metallisable dye.

In the metallisation of dyes, many metals prove troublesome in the neutral and above all in the alkaline range because they are precipitated as hydroxides. The difficulties that occur are avoided by using complexing agents, for example glucose, oxalic acid, tartaric acid or salicylic acid. These compounds, however, possess a number of disadvantages. They are used in the same molar amounts as the metals themselves or often even in excess and create problems in respect of their biodegradability. For example, large amounts of oxygen are required to break down glucose and salicylic acid is biodegradable to only about 50% in a purification plant and furthermore "mobilises" $Cr^{3+}$ and other heavy metal ions, i.e. these metals are partly dissolved out of the sludge at pH 7 to 8. Tartaric acid is biodegradable to a satisfactory extent, but the amount produced is limited since it has hitherto been obtained principally by the natural method.

Complexing agents for the manufacture of metal complex dyes have now been found which do not possess the disadvantages previously mentioned. These complexing agents according to the invention are derived from hydroxycarboxylates. It is expedient to use the ordinary commercial polycarboxylic acids or the low molecular hydroxycarboxylic acids which are obtained in situ from glyoxal or glyoxalic acid in the reaction mixture.

The invention therefore provides a process for the manufacture of metal complex dyes which comprises reacting a metallisable dye in a solvent, preferably in water, in the presence of a polyhydroxycarboxylate, with a metal compound.

A modification of the process according to the invention consists in first manufacturing the hydroxycarboxylate complex of the metal and the reacting this complex with the metallisable dye.

The metal complex dyes are obtained by these processes in at least as equally good yield and quality as through using the complexing agents previously mentioned. But from the ecological point of view the process according to the invention affords distinct advantages, since the hydroxycarboxylates used are satisfactorily biodegradable and in addition have good toxicological properties as regards humans. Furthermore, no mobilisation of heavy metal ions takes place in the purification plant. Above all, however, only about 40 to 60 kg of polyhydroxycarboxylate as against a good 300 kg of glucose, tartaric acid or salicylic acid in the known processes are required to manufacture on kilomole of metal complex dye.

The polyhydroxycarboxylates used according to the invention are known and marketed by Degussa e.g. as POC types. Their manufacture is described for example in Tenside Detergents, 11 (1974) 57-71 and in DOS No. 2,256,908. The products in question are low molecular polyelectrolytes based on synthetic polymers which contain no nitrogen and phosphorus of the polyhydrocarboxylate type. The average molecular weight of the compounds used is preferably from c. 1500 to c. 6000; but the process is not restricted to substances in this range and it is also possible to use e.g. oligomers of low molecular weight. The polyhydroxycarboxylates can also be modified by furhter groups, e.g. by groups with reductive action, for example aldehyde groups.

The amounts in which the polyhydroxycarboxylates are used in the process according to the invention can vary within wide limits depending on the nature of the metal and of the dye and depending on the reaction conditions. In general, however, it is sufficient and advantageous to use less complexing agent than is required for complexing the total amount of metal.

The preferred procedure is that the metallisable dye and the polyhydroxycarboxylate are in solution and the metal compound is added gradually during the reaction.

If the metal is in a state of oxidation in which it is soluble in the reaction medium and is converted only by oxidation or reduction into an insoluble form, it is also possible for the metal compound to be in the form of a solution and to add the oxidant or reducing agent dropwise together with the polyhydroxycarboxylate. The formation of the metal complex dye causes the continual reformation of free polyhydroxycarboxylate.

If after termination of the metallising the dye is not isolated in the pure form, but in a form in which the free polyhydroxycarboxylates are not separated, then particularly useful preparations are obtained because the polyhydroxycarboxylates can be used as dispersants for softening water and for sequestering foreign metals.

Suitable metals for the process according to the invention are all those which are able to form complexes both with the polyhydroxycarboxylates and with the dyes used. These are metals with an atomic number higher than 20, preferably manganese, iron, nickel, vanadium, and especially copper, cobalt and, above all, chromium. These metals are added in the form of metal donors, e.g. of salts which contain the metal as cation, or of complex metal compounds, e.g. tal-ammine complexes. The metals can be in the same state of oxidation as in the metal complex dye to be formed; but they can also be in higher or lower states of oxidation if in addition a reducing agent or an oxidant is added. As reducing agent it is possible to use bisulphite, the solvent, or also the polyhydroxycarboxylate itself, provided this latter carries in addition reductive groups, e.g. aldehyde groups.

The amount of metal compound is preferably so chosen that a little more metal is used than is required for the formation of the metal dye complex. This surplus, however, need only be negligible, e.g. about 10%, and in a number of instances it is sufficient to use an equimolar amount of metal compound.

Suitable dyes for the process according to the invention are all those which can be metallised under the reaction conditions. These are in particular azo and azomethine dyes, e.g. the known o,o'-dihydroxy-, o-hydroxy-o'-amino-, o-carboxy-o'-hydroxy- or o-carboxy-o'-aminoazo dyes. Instead of carrying a hydroxy group in the ortho-position, these dyes can also carry an alkoxy group.

These dyes are known. The azo dyes, for example, are manufactured by coupling a diazonium compound which is obtained by diazotising an aromatic or heteroaromatic amine with a coupling component which is derived preferably from the following base materials: phenols, naphtols, naphthylamines, 5-pyrazolones, 5-aminopyrazolones, acetoacetic arylamides, especially acetoacetic arylanilides, 2,3- and 2,6-dihydroxy-pyridines, N-substituted 2-hydroxy-6-pyridones, indoles or indanediones. The azomethine dyes are obtained by condensing aromatic or heteroaromatic amines with aldehydes.

The dyes can carry solubilising groups, e.g. sulpho, sulphonamido or sulphone groups, or they can be water-insoluble, and can furthermore be substituted by the customary non-ionogenic substituents of azo dyes, e.g. by fluorine or chlorine atoms, nitro groups low molecular alkyl or alkoxy groups, aryl, especially phenyl, groups, and by phenyl radicals which are substituted by chlorine atoms, sulpho or low molecular alkyl groups; low molecular alkanoylamino, alkoxycarbonylamino or benzoylamino radicals as well as by carbalkoxy or cyano groups. The term "low molecular" denotes herein radicals of 1 to 4 carbon atoms. It is possible to use virtually all those dyes which can be converted into metal complex dyes by the methods described herein.

It is possible to manufacture 1:1, 1:3 or, preferably, 1:2 metal dye complexes by the process according to the invention.

Suitable solvents for the process according to the invention are e.g. all those which have been used in the customary processes hitherto for metallising dyes. Such solvents are organic solvents, e.g. alcohols or ketones, water, or mixtures of water and organic solvents. The preferred solvent, however, is water.

The metal complex dyes according to the present invention are manufactured by dissolving or suspending e.g. 1 part of the metallisable dye in 2 to 200, preferably 5 to 80, in particular 10 to 30, parts of solvent, especially in water, and adding at a temperature of 20° to 150° C., preferably 20° to 100° C., a solution of 0.01 to 10 parts, preferably 0.05 to 1 part, of polyhydroxycarboxylate, optionally together with 1 to 10 parts of acid or base, e.g. sodium hydroxide solution. Then over the course of 5 to 300 minutes, preferably 20 to 120 minutes, a solution of 0.05 to 5 parts, preferably 0.1 to 1 part, of a metal compound is added and the reaction mixture is stirred until the metallising is terminated, preferably after the temperature has been raised by 10° to 50° C. The resultant metal complex dye is then isolated by the customary methods, by filtration or spray drying.

If the metal in the metal compound used is in a state of oxidation which is different from that in the metal complex dye to be formed, it is also possible to put the metal compound together with the metallisable dye into the reaction vessel and to add the oxidant or reducing agent in equivalent amount, or preferably in a surplus of 5 to 20%, together with the polyhydroxycarboxylate.

Another possibility of manufacturing the metal complex dyes consists in dissolving or suspending 1 part of the metallisable dye in 2 to 200, preferably 5 to 80, especially 10 to 30, parts of solvent, e.g. in water, and at a temperature of 20° to 150° C., preferably 20° to 100° C., adding 0.1 to 10, preferably 0.3 to 3, parts of a manufactured polyhydroxycarboxylate complex of a metal over the course of 10 to 300 minutes and stirring the mixture until the reaction is terminated.

The following Examples illustrate the invention in more detail but do not limit it to what is described therein. The parts and percentages are by weight.

EXAMPLE 1

81.3 parts of the monoazo dye of the formula

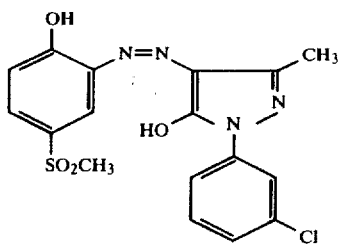

are suspended in 1500 parts of water. (A direct use of the suspension which is obtained in the manufacture of the dye by coupling is possible without any problems). This suspension is heated to 70°-80° C. and then a solution of 15 parts of sodium bichromate and 4 parts of sodium hydroxide in 100 parts of water is added with good stirring. The reaction mixture is then heated over the course of 30 minutes to 98°-100° C. Simultaneously, a solution of 10.5 parts of sodium bisulphite and 5 parts of polyhydroxycarboxylate (POC-OS-5060, Degussa; molecular weight=c. 5400; COO⊖: OH⊖ ratio 7-9) in 100 parts of water is added dropwise at constant speed within 2 hours. When the reaction is terminated, the resultant orange red 1:2 chromium complex dye is isolated by filtration and dried to yield a powder which dissolves well in water and dyes wool from a weakly acid bath in orange shades wich are very fast to wet treatments and light.

EXAMPLE 2

A greyish blue, finely crystalline 1:2 chromium complex dye which dyes wool from a weakly acid bath in bluish grey shades with good fastness properties is obtained by using 83.3 parts of the dye of the formula

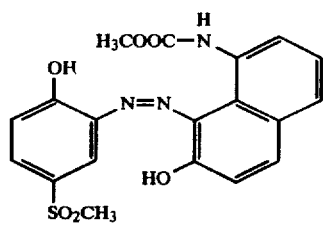

instead of the metallisable dye of Example 1 and otherwise carrying out the procedure described therein.

EXAMPLE 3

83.3 parts of the metallisable dye of Example 2 are suspended in 600 parts of water and 6 parts of the polyhydroxycarboxylate used in Example 1 are added. The suspension is heated to 70° to 80° C. and at this temperature a solution of 14.5 parts of sodium bichromate and 4 parts of sodium hydroxide in 100 parts of water is added with good stirring. The reaction mixture is subsequently heated over the course of 30 minutes to 98°-100° C. and a solution of 10.5 parts of sodium bisulphite and 5 parts of the above polyhydroxycarboxylate in 100 parts of water is added dropwise simultaneously over the course of 120° C. Upon termination of the reaction, the viscous yet readily stirrable reaction solution is treated with 5 parts of ammonia and dried in a spray drier after addition of the requisite amount of dextrin for adjusting the colour strength.

In this procedure, the polyhydroxycarboxylate is used on the one hand as an auxiliary complexing agent for the chroming of the azo dye and on the other hand remains in the dyeing preparation where it does duty as an auxiliary dispersant and a stabiliser of water hardness.

EXAMPLE 4

83.3 parts of the metallisable dye of Example 2 are suspended in 600 parts of water and the suspension is heated to 70° C.-80° C. Ath this temperature a solution of 14.5 parts of sodium bichromate and 4 parts of sodium hydroxide in 100 parts of water is added with good stirring. The reaction mixture is subsequently heated within 30 minutes to 98° to 100° C. and simultaneously a solution consisting of 10.5 parts of sodium bisulphite, 15 parts of an aqueous 30% glyoxal solution and 100 parts of water is added dropwise over the course of 120 minutes. Upon termination of the reaction, the viscous yet readily stirrable reaction solution is treated with 5 parts of ammonia and filtered. The same greyish blue dye as in Example 2 is obtained.

EXAMPLE 5

A reddish brown mixture of 1:2 chromium complex dyes which dye wool and nylon from a weakly acid bath in reddish brown shades of good fastness properties is obtained by using a mixture of 61 parts of the dye of the formula

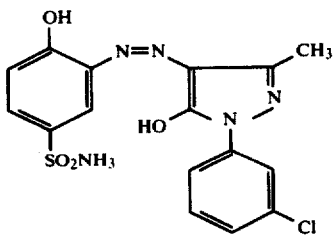

and 20.8 parts of the dye of the formula

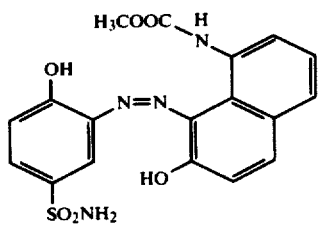

instead of the metallisable dye of Example 1 and otherwise carrying out the procedure described therein.

EXAMPLE 6

68 parts of the dye of the formula

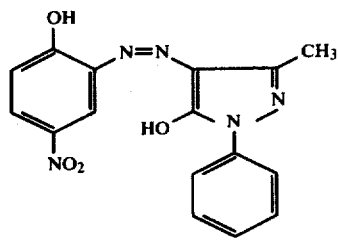

are suspended in 1500 parts of water and the suspension is heated to 40° C. To this suspension is added a solution of 5 parts of the polyhydroxycarboxylate of Example 1 in 35 ml of 50% sodium hydroxide solution. Over the course of 20 to 30 minutes, 28.5 parts of $CoSO_4 \cdot 7H_2O$ are added dropwise as 12% aqueous solution. With stirring, the reaction mixture is heated to 70°-75° C. and checked after one hour for complete cobaltising. After termination of the reaction, the pH is adjusted to 9.4-9.6 and a solution of 4.5 parts of cyclohexylamine in 5 parts of 30% hydrochloric acid and 30 parts of ice water is added. The pH is adjusted with hydrochloric acid to 4.0-4.2 and the mixture is heated to 95°-97° C. After about half an hour, the mixture is diluted to 2400 ml with cold water. 800 ml is removed from the solution and filtered. The rest of the solution is again diluted to 2400 ml. This operation is repeated 3 times, then the entire solution is filtered and the precipitate is washed with 800 ml of water. The yellowish brown 1:2 cobalt complex dye dissolves very readily in the customary solvents and yields orange red colourations in various lacquer systems. The residue which is insoluble in acetone is less than 1.8% in this procedure. When manufacturing the dye by conventional methods without using a polyhydroxycarboxylate, a product containing between 2 and 7% of a residue insoluble in acetone is obtained.

EXAMPLE 7

With stirring, a solution of 12 parts of polyhydroxycarboxylate and 10 parts of 50% sodium hydroxide solution is added to a solution of 28.5 parts of $CoSO_4 \cdot 7H_2O$ in 200 ml of water. A blue suspension of the cobalt/polyhydroxycarboxylate complex is obtained.

This suspension is added dropwise over the course of 20 to 30 minutes to a suspension of 68 parts of the metallisable dye of Example 6 in 1500 parts of water. The mixture is heated with stirring to 70°-75° C. and this temperature is kept until the cobaltising is complete. The procedure of Example 6 is then carried out to give the metal complex dye in the same yield and purity. The same amount of the complex is obtained in the same purity by using instead of the suspension in this Example the dried cobalt/polyhydroxycarboxylate complex which is isolated by filtration.

EXAMPLE 8

68 parts of the metallisable dye of Example 6 are suspended in 1000 parts of n-butanol. To this suspension is added a solution of 28.5 parts of $CoSO_4 \cdot 7H_2O$ in 50 parts of water and 30 parts of the polyhydroxycarboxylate of Example 1 as a 40% aqueous solution. The mixture is heated with good stirring to 40° C., 10 parts of 50% sodium hydroxide solution are added and the batch is further heated to 100°-105° C., in the process of which 40 to 50 parts of water are separated in a steam trap. A solution of 4 parts of cyclohexylamine in 40 parts of n-butanol are subsequently added and the pH is adjusted to 4.5 to 5 by addition of c. 10 parts of 85% formic acid. The dark brown solution is filtered over a suction filter and the filtrate is evaporated to dryness in vacuo with simultaneous recovery of the solvent. The same product is obtained as in Example 6, but it does not contain any inorganic residue which is insoluble in acetone.

We claim:

1. In the process of metallizing a metallizable dyestuff, in solution or suspension in water or organic solvent, by reaction of the dyestuff with a metal cation, in the presence of a complexing agent which prevents precipitation of the metal cation under the conditions of the metallization reaction, the improvement which comprises using less than a stoichiometric amount of the complexing agent and using as the complexing agent a poly(hydroxycarboxylate) which is a polymerized low molecular weight hydroxycarboxylic acid.

2. The process of claim 1, wherein the poly(hydroxycarboxylate) is formed in situ from glyoxal or glyoxalic acid.

3. The process of claim 1, wherein the solution or suspension is aqueous.

4. The process of claim 1, wherein the dyestuff is an azo dye.

5. The process of claim 1, wherein the metal cation is a copper, iron or nickel cation.

6. The process of claim 1, wherein the metal cation is a cobalt or chromium cation.

7. The process of claim 6, wherein the cation is a chromium III cation.

8. The process of claim 7, wherein the chromium III cation is formed in situ by reduction of a chromium VI cation with bisulfite.

9. The process of claim 1, wherein the poly(hydroxycarboxylate) has an average molecular weight of 1500 to 6000.

10. The process of claim 1, wherein the poly(hydroxycarboxylate) is present in an amount of 0.01 to 10 parts per 1 part of dyestuff and 0.05 to 5 parts of metal cation.

11. The process of claim 1, wherein the poly(hydroxycarboxylate) is present in an amount of 0.05 to 1 part with 0.1 to 1 part of metal cation.

12. The process of claim 1, wherein the metal cation is formed in situ by reduction.

13. The process of claim 1, wherein the metal cation is formed in situ by oxidation.

14. The process of claim 1, wherein a mixture of the metallized dyestuff and the poly(hydroxycarboxylate) is isolated from the reaction solution or suspension.